H. H. CARTER.

Combined Corn and Cotton Planter.

No. 9,648. Reissued April 12, 1881.

Attest:
Charles Pickles
Saml. S. Byrd

Inventor:
Hiram H. Carter
by C. D. Moody Atty.

N. PETERS, PHOTO-LITHOGRAPHER, WASHINGTON, D. C.

H. H. CARTER.

Combined Corn and Cotton Planter.

No. 9,648. Reissued April 12, 1881.

Attest:
Charles Pickles
Saml. S. Boyd

Inventor:
Hiram H. Carter.
by C. D. Moody.
atty.

N. PETERS, PHOTO-LITHOGRAPHER, WASHINGTON, D. C.

UNITED STATES PATENT OFFICE.

HIRAM H. CARTER, OF HEADSVILLE, TEXAS.

COMBINED CORN AND COTTON PLANTER.

SPECIFICATION forming part of Reissued Letters Patent No. 9,648, dated April 12, 1881.

Original No. 233,979, dated November 2, 1880. Application for reissue filed December 8, 1880.

*To all whom it may concern:*

Be it known that I, HIRAM H. CARTER, of Headsville, county of Robertson, Texas, have made new and useful Improvements in Corn-Planters, of which the following is a full, clear, and exact description, reference being had to the annexed drawings, making part of this specification, in which—

Figure 1:
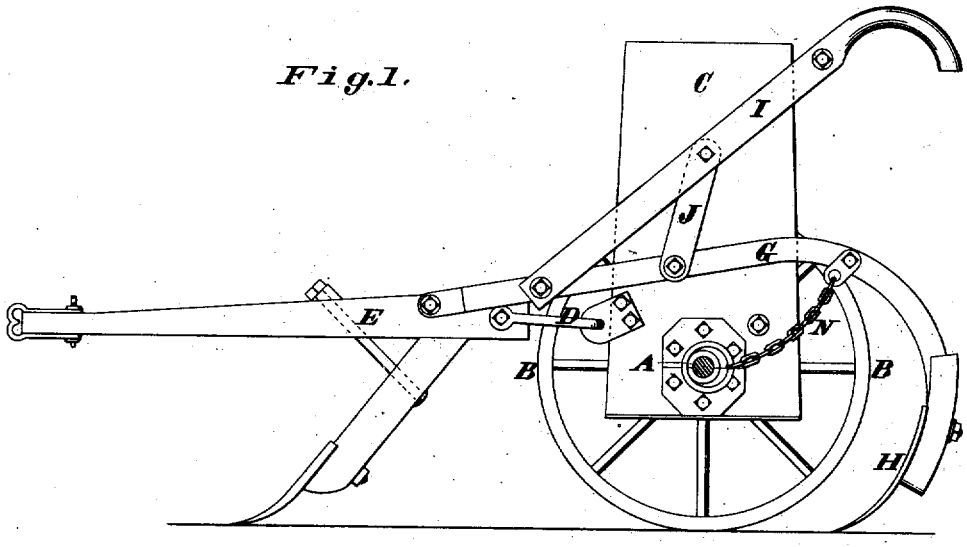
Figure 2:
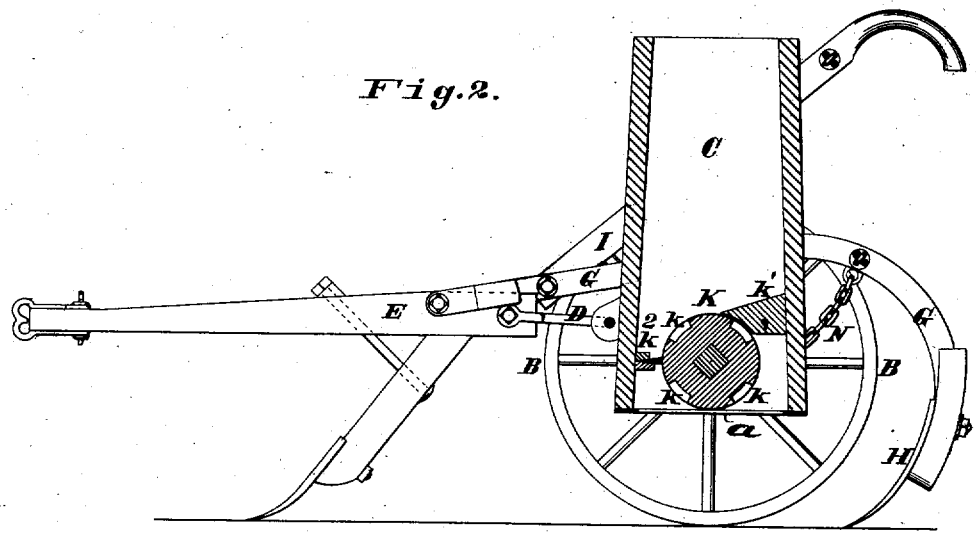
Figure 3:
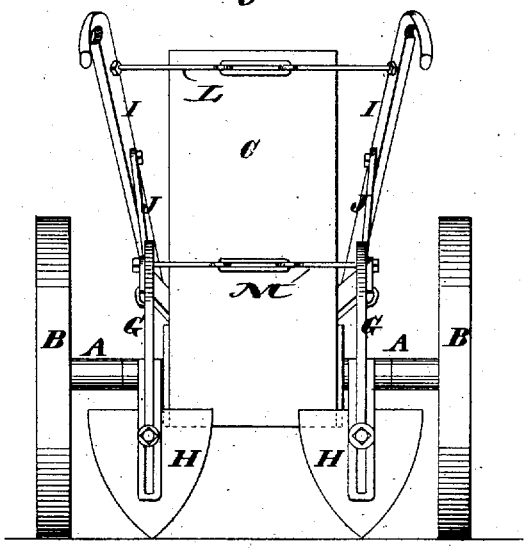
Figure 4:
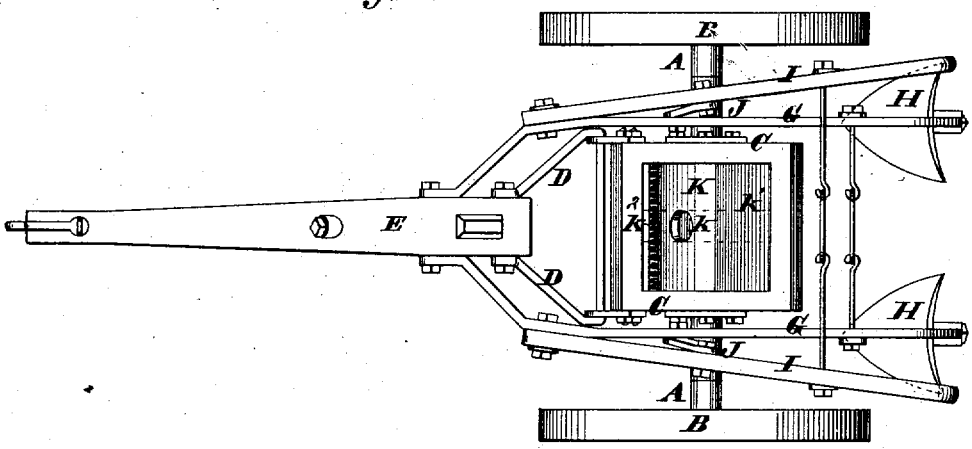

Figure 1 is a side elevation of the improved planter, one of the wheels being removed; Fig. 2, a sectional side elevation; Fig. 3, a rear end elevation, and Fig. 4 a plan.

The same letters denote the same parts.

The improvement consists in pivoting the beam which carries the shovel for making the furrow into which the seed is dropped to the forward ends of the beams of the covering-shovels, the handles of the machine being secured to the covering-shovels' beams; in connecting the seed-box and furrow-plow beam, by means of a loose link or connection, so that the beam can be moved independently of the seed-box; in the manner of supporting the seed-box; in the shape of the seed-box, and in the mechanism for feeding the corn from the seed-box.

Referring to the drawings, A represents the axle; B B, the driving-wheels, and C the seed-box.

The driving-wheels are secured rigidly to the axle, causing the latter to revolve as the machine is drawn forward, and the axle within the seed-box, where it passes through the seed-cylinder X, is squared to cause the cylinder to rotate with it. The cylinder K has the recesses *k k* to receive the kernels of corn, and just above the cylinder and at the rear thereof is a guard-plate, *k'*, to prevent the corn from passing down behind the cylinder, and in front of the cylinder and brushing against its surface, or so nearly against it as to keep the corn from falling directly down in front of the cylinder, is a brush, $k^2$. The brush is preferred to a rigid guard, because whenever the cylinder (which is generally of wood) is swollen by moisture, the bristles of the brush yield sufficiently to make room for the cylinder, allowing it to turn freely. The corn then can fall only into the recesses *k k*, whence, as the cylinder revolves, it is discharged into the bottom of the seed-box and out through the slot *a*.

In place of making the seed-box larger at the top, as heretofore, it is made larger at the bottom and smaller at its top. The grain then above the cylinder has less tendency to pack, and it can be more readily discharged after passing the cylinder. The seed-box is held in a vertical position upon the axle by means of a link, D, or other fastening, which at the forward end is pivoted or jointed to the beam E. The latter is provided with a shovel for opening the furrow for the grain to drop into, and at its forward end it has the usual clevis. The beam E at its rear end is also pivoted or jointed to the forward ends of the beams G G, which beams G G at their rear ends are provided with the covering-shovels H H. The beams G G pass by the seed-box, but are not secured to it.

I I represent the plow-handles. They are attached to the beams G G, and braces J J may be used to strengthen the connection with the beams. By means of the handles, which are loosely connected by means of the connection L, the beam E and beams G G can be controlled, as desired, and without moving the seed-box to any great extent, or so as to throw out its contents. At the same time the slight oscillation of the seed-box arising from its jointed connection with the beam E is desirable, as it tends to shake the contents of the seed-box downward therein. The beams G G are also loosely connected by means of the connection M. The beams G G are also connected with the axle A by means of the chains N N, enabling the entire machine to be lifted by raising the handles. In this way, as at the end of the furrow, the machine can be raised and turned around.

I claim—

1. In a corn-planter, the combination of the beam E, pivoted between the front ends of the two beams G G, which have the handles secured to them, the seed-box, the axle, dropping-cylinder, and driving-wheels, substantially as shown.

2. The combination of the beam E, pivoted between the front ends of the two beams G G, which have the handles secured to them, the seed-box, and the connecting link or fastening which connects the seed-box to the beam E, substantially as described.

3. The combination of the seed-box, axle, and driving-wheels with the beams G G, having the handles secured to them, and the chains for connecting the axle with the beams, the beams G being disconnected from the seed-box, substantially as described.

4. The combination, in a walking-planter, of the hopper C, beam E, and beams G G, pivoted in front of the hopper and the covering device, whereby the movement of the beam E is controlled, substantially as described.

5. The combination of the seed-box C and axle A, passing through the seed-box and supporting it, said box also having a pivoted connection with the supporting-frame, substantially as described.

6. The combination of the handles I I, beams G G, axle A, seed-box C, chains N N, link-connection D, and beam E, substantially as described.

7. The combination of the beam E, carrying the furrow-shovel, and the beams G G, carrying the covering-shovels H H, said beams G G being pivoted in front of the hopper to the rear end of the beam E, substantially as described.

H. H. CARTER.

Witnesses:
SAML. S. BOYD,
C. D. MOODY.